United States Patent
Rodgers et al.

(10) Patent No.: US 8,913,609 B2
(45) Date of Patent: *Dec. 16, 2014

(54) SYSTEM AND METHOD FOR DEMULTIPLEXING DIFFERENT STREAM TYPES IN A PROGRAMMABLE TRANSPORT DEMULTIPLEXER

(75) Inventors: Stephane W. Rodgers, San Diego, CA (US); Ut Nguyen, Del Mar, CA (US); Rajesh S. Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,844

(22) Filed: Feb. 27, 2012

(65) Prior Publication Data

US 2012/0155488 A1 Jun. 21, 2012

Related U.S. Application Data

(63) Continuation of application No. 11/393,121, filed on Mar. 30, 2006, now Pat. No. 8,125,987.

(51) Int. Cl.
| | |
|---|---|
| *H04L 12/28* | (2006.01) |
| *H04J 3/16* | (2006.01) |
| *H04J 3/24* | (2006.01) |
| *H04N 9/80* | (2006.01) |
| *H04N 21/434* | (2011.01) |
| *H04N 21/236* | (2011.01) |
| *H04N 21/433* | (2011.01) |
| *H04L 12/701* | (2013.01) |

(52) U.S. Cl.
CPC ....... *H04N 21/4344* (2013.01); *H04N 21/4341* (2013.01); *H04N 21/23608* (2013.01); *H04N 21/4334* (2013.01); *H04L 45/00* (2013.01)
USPC ............ 370/389; 370/471; 370/474; 386/240

(58) Field of Classification Search
None
See application file for complete search history.

(56) References Cited

U.S. PATENT DOCUMENTS

| | | | |
|---|---|---|---|
| 5,621,772 | A | 4/1997 | Maturi et al. |
| 6,747,991 | B1 * | 6/2004 | Hemy et al. .................. 370/468 |
| 6,922,730 | B1 | 7/2005 | Yaple |
| 7,173,947 | B1 | 2/2007 | Ramakrishnan et al. |
| 7,920,631 | B2 * | 4/2011 | Vicars-Harris .......... 375/240.25 |
| 8,125,987 | B2 | 2/2012 | Rodgers et al. |
| 2001/0005447 | A1 | 6/2001 | Kawamura et al. |
| 2001/0026561 | A1 * | 10/2001 | Morris et al. ................. 370/487 |
| 2002/0031330 | A1 | 3/2002 | Ono et al. |
| 2002/0059642 | A1 | 5/2002 | Russ et al. |
| 2002/0085592 | A1 | 7/2002 | Ono et al. |
| 2002/0105905 | A1 | 8/2002 | Boyle et al. |
| 2002/0135607 | A1 * | 9/2002 | Kato et al. .................... 345/716 |
| 2002/0159632 | A1 * | 10/2002 | Chui et al. .................... 382/168 |
| 2002/0181595 | A1 * | 12/2002 | Obata et al. ............... 375/240.25 |

(Continued)

*Primary Examiner* — Faruk Hamza
*Assistant Examiner* — Thinh Tran
(74) *Attorney, Agent, or Firm* — Foley & Lardner LLP (57) ABSTRACT

In one embodiment, there is presented a method for processing data. The method comprises receiving a plurality of packets, wherein each packet comprises a payload, and wherein the plurality of packets carry video data encoded in accordance with an encoding standard from a plurality of encoding standards; identifying encoding standards encoding the video data carried in the payloads of the plurality of packets; and inserting identifiers that identify the encoding standard encoding the video data carried in the payloads of the plurality of packets into the plurality of packets.

19 Claims, 4 Drawing Sheets

(56) References Cited

U.S. PATENT DOCUMENTS

| | | |
|---|---|---|
| 2002/0191543 A1 | 12/2002 | Buskirk et al. |
| 2003/0001964 A1 | 1/2003 | Masukura et al. |
| 2003/0217362 A1 | 11/2003 | Summers et al. |
| 2004/0156623 A1* | 8/2004 | Kato et al. ............... 386/98 |
| 2005/0190872 A1* | 9/2005 | Seong et al. ............. 375/354 |
| 2005/0195334 A1* | 9/2005 | Yeh et al. ................ 348/700 |
| 2005/0286870 A1 | 12/2005 | Owada et al. |
| 2006/0041431 A1* | 2/2006 | Maes ...................... 704/270.1 |

\* cited by examiner

SYSTEM AND METHOD FOR DEMULTIPLEXING DIFFERENT STREAM TYPES IN A PROGRAMMABLE TRANSPORT DEMULTIPLEXER

CROSS REFERENCE TO RELATED APPLICATION

This application is a continuation of U.S. patent application Ser. No. 11/393,121, filed on Mar. 30, 2006. The contents of the aforementioned patent application are hereby incorporated herein by reference in its entirety.

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A transport stream can comprise multiplexed data from a variety of channels, and a variety of transponders. The data can then be provided to decoders for decoding and eventual presentation. The increasing number of channels and potential destinations in modern media and multimedia systems place considerable demultiplexing demands on such media and multimedia systems.

In order to process multiple data types from multiple sources simultaneously, reliance may not be had on the fact that simultaneous data belongs to the same format. There may be a large number of different formats to be processed simultaneously.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

System(s) and/or method(s) are provided for demultiplexing different stream types in a programmable demultiplexer, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the present invention relate to processing video and audio signals. More specifically, certain embodiments of the invention relate to a method and system for demultiplexing different stream types when they have been merged together into a single multiplexed stream.

In general, transport demultiplexers may be required to process data of different formats. In the case of processing incoming data a single input format at a time, processing of incoming data follows a given set of rules in order to provide parsing which is native to the format. Processing may be a single input at a time, due to the fact that only one data source is supported, only one destination is supported, or if multiple data sources are supported, because all the input sources were in the same format (usually the set top box may be configured only a certain way for a certain configuration setting). A single state machine per format that needs to be parsed can be used. When data from the particular format arrives, that state machine associated with the format can the parse data appropriately. A single configuration parameter can be set at the beginning which indicates the type of data to be parsed, and then the state machine holds onto its states in between data arrival. However, with the preponderance of different input formats, as well as the requirements to process data from different sources and different formats simultaneously, the foregoing may not provide acceptable performance.

When processing multiple streams, the formats can change at every packet boundary. Accordingly, one set of rules may not be sufficient to process the aggregate stream. Additionally, the multiple formats may have multiple initialization states. When processing multiple formats simultaneously, information about a packet, such as its input format, packet length, and other parameters may not be ascertainable in time to process the packet.

Figures 1, 2:
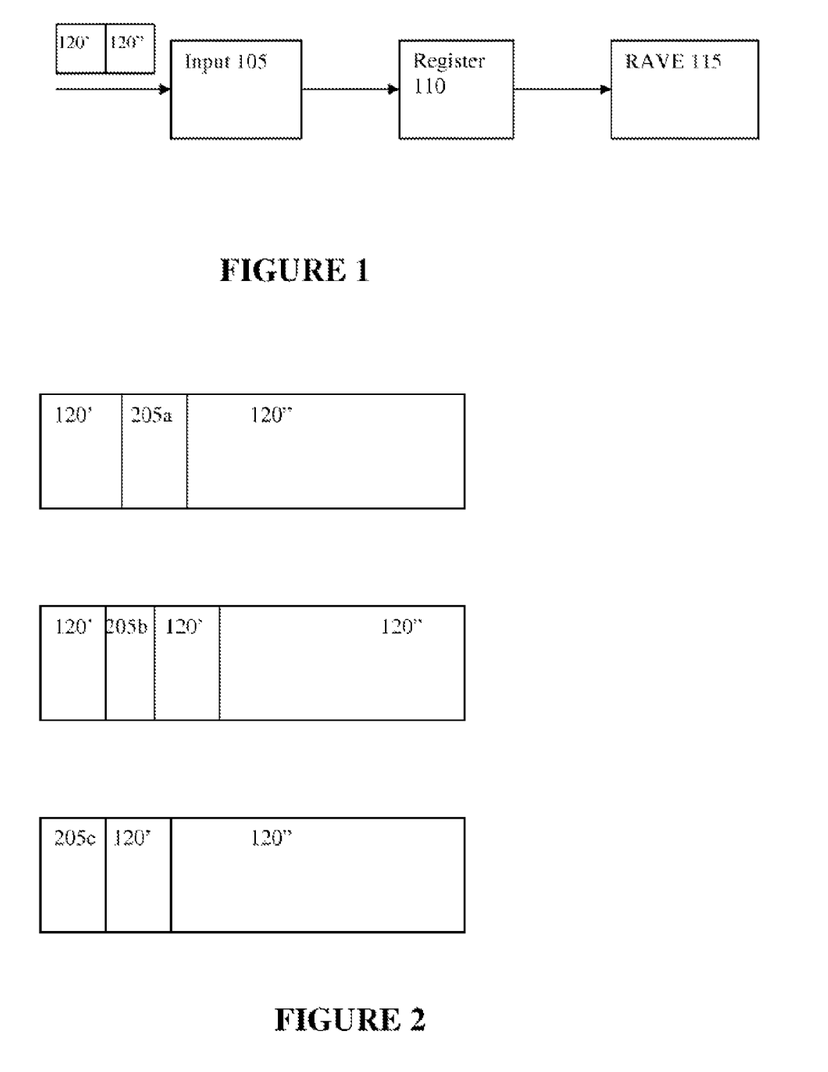
FIG. 1 is a block diagram of an exemplary circuit for processing data in accordance with an embodiment of the present invention.
FIG. 2 is a block diagram of an exemplary packet in accordance with an embodiment of the present invention.

Referring now to FIG. 1, there is illustrated block diagram of an exemplary circuit for processing data in accordance with an embodiment of the present invention. The circuit comprises an input 105, a register 110, and a transport demultiplexing engine 115, now referred to as a Record Audio Video Engine (RAVE).

The input 105 can receive packets 120 from a communication medium, such as a cable network or the Internet. The packets 120 include a payload 120' carrying encoded data. The encoded data can come from a number of different sources. The encoded data is packetized for transmission and multiplexed with other data. Packetizing breaks up an associated set of encoded data into smaller portions and places the smaller portions into the payload 120' of a packet 120.

An associated set of data can include, for example, a data file, a video program, an audio program, to name a few. The packets 120 carrying the smaller portions of the associated set of encoded data are multiplexed over a communication channel with other packets 120 carrying smaller portions of other associated sets of encoded data.

The packets 120, including the data carried in the payload can be encoded in accordance with a variety of encoding standards. The encoding standards can include, for example, MPEG, DirecTV, DVD Input, PES input, ES input, or DirecTV with MPEG-1, to name a few.

Generally, the associated set of encoded data is encoded using the same encoding standard. However, other associated sets of encoded data that are multiplexed onto the same communication channel may be encoded with a different encoding standard.

The register 110 identifies the encoding standards for each of the packets 120. The register 110 can comprise hardware components, such as logic, or may be a programmed circuit. The register 110 inserts an identifier into each packet 120 that identifies the encoding for the packet.

In certain embodiments of the present invention, the packets 120 include headers 120", and the register 110 identifies the encoding standard for the packet by examining a field in the header 120".

Additionally, the register 110 can also determine and insert other information about the packet 120 into the packet 120. For example, in certain embodiments of the present invention, the register 110 can determine the length of the packet and insert another identifier that identifies the length of the packet.

The identifier(s) can be inserted into the packet in a variety of ways. In certain embodiments of the present invention, the identifier(s) can be appended to the packet header 120". In other embodiments, the register 110 can attach another header to the packet 120. The header can include the identifier(s).

The transport demultiplexing engine 115 receives and processes the packets 120. The transport demultiplexing engine 115 processes each of the packets based on rules that are associated with the encoding standard for the packet. Accordingly, the transport demultiplexing engine 115 examines the identifier identifying the encoding standard for the packet 120. Based on the identifier, the transport demultiplexing engine 115 selects a set of rules that are associated with the encoding standard.

Referring now to FIG. 2, there is illustrated a book diagram of exemplary packets 120 in accordance with an embodiment of the present invention. The packets 120 include a payload 120" and a header 120'.

In certain embodiments, the identifier(s) can be appended to the header 120', e.g., identifier 205a. Alternatively, in certain embodiments, the identifier(s) can be written into the header 120', e.g., identifier 205b, overwriting another field in the header 120'. In other embodiments, another header 120' can be placed onto the packet that includes the identifier(s), e.g., identifier 205c.

Figure 3:
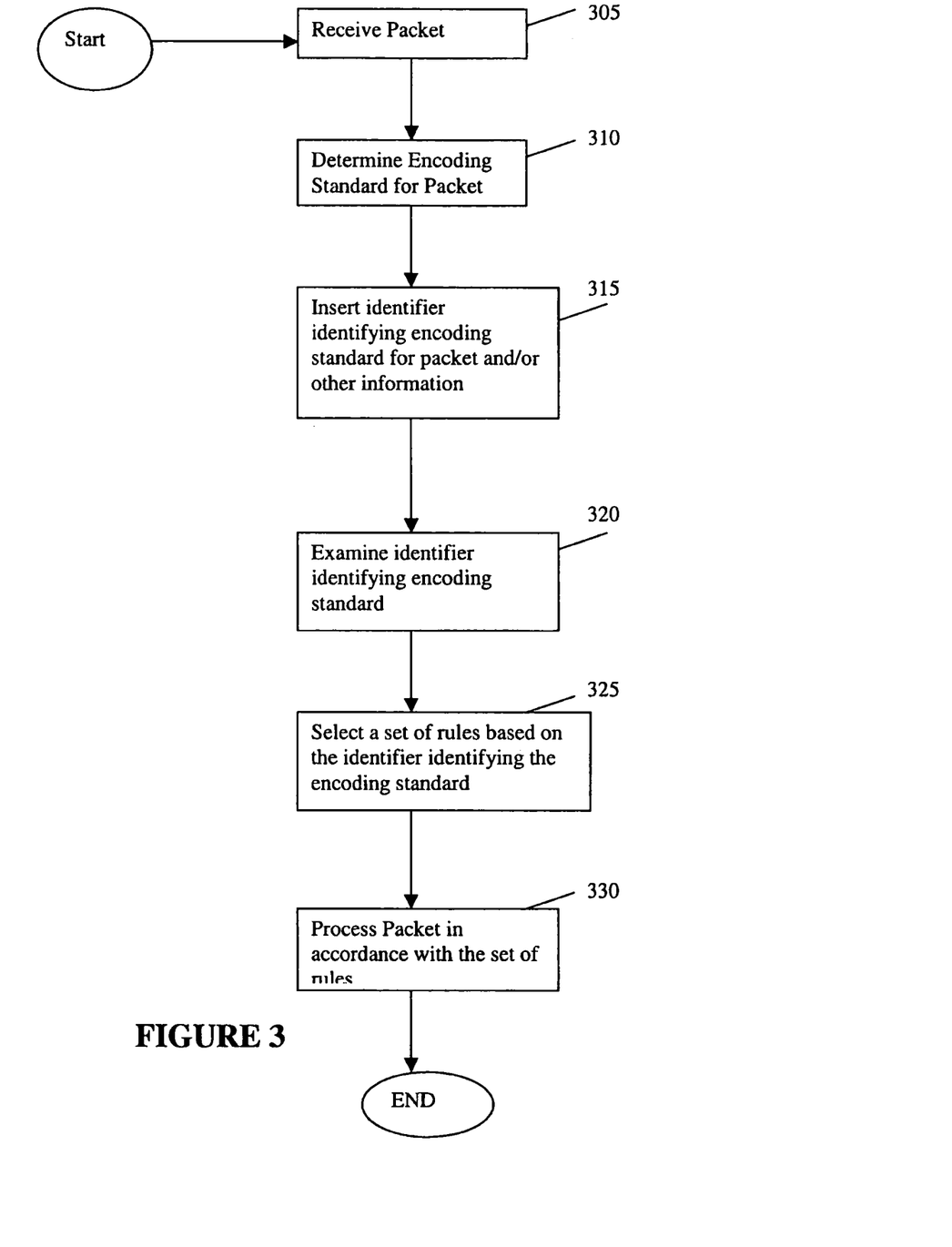
FIG. 3 is a flow diagram for processing data in accordance with an embodiment of the present invention.

Referring now to FIG. 3, there is illustrated a flow diagram for processing data in accordance with an embodiment of the present invention. At 305, a packet 120 is received at input 105.

At 310, the register 110 determines the encoding standard for the packet 120. At 315, the register 110 inserts identifier(s) that identify the encoding standard for the packet, and other information regarding the packet.

At 320, the transport demultiplexing engine 115 examines the identifier that identifies the encoding standard for the packet 120. Based on the identifier identifying the encoding standard for the packet 120, the transport demultiplexing engine 115 selects a set of rules associated with the encoding standard at 325, and processes the packet 120 in accordance with the set of rules at 330.

The foregoing can be used in a variety of applications. For example, video data transmitted over a network, such as the internet or a cable network, is often multiplexed with other data. Encoded video data that is associated with a particular program, known as an elementary stream, is transmitted in transport packets. The video data associated with a particular program, as well as audio data stream(s) associated with the same program, and audio and video data associated with other programs are multiplexed onto a communication channel.

The transport packets can be encoded with varying encoding standards, and can have different lengths. The encoding standards can include, for example, MPEG (188 bytes), DirecTV™ (130 bytes), DVD Input (128 bytes), PES input (188 bytes), ES input (188 bytes), or DirecTV with MPEG-1, to name a few. The transport packets form what is known as a transport stream.

Figure 4A:
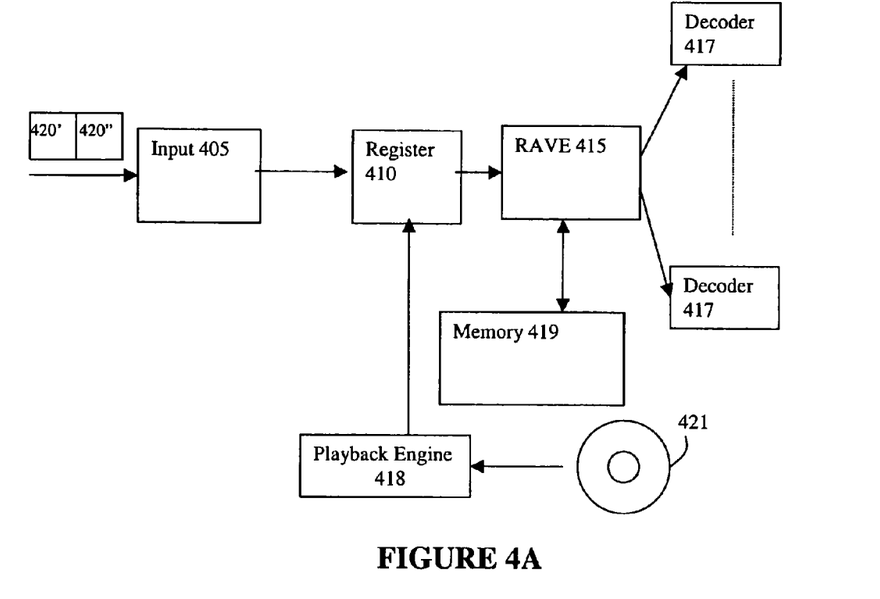
FIG. 4A is a block diagram of an exemplary circuit for processing data in accordance with an embodiment of the present invention.

Referring now to FIG. 4A, there is illustrated a system for processing video or audio data in accordance with an embodiment of the present invention. The system 400 comprises an input 405, a register 410, a transport demux engine, or RAVE 415, a plurality of decoders 417, a playback engine 418 and memory 419.

The input 405 receives a transport stream comprising transport packets 420. The transport packets 420 include a payload 420' carrying encoded video or audio data. The encoded video or audio data can come from a number of different sources, for example, a video or audio associated with a program, known as an elementary stream.

The elementary stream is packetized for transmission and multiplexed with other elementary streams. Packetizing breaks up the elementary stream into smaller portions and places the smaller portions into the payload 420' of a transport packet 420.

The playback engine 418 provides packets 120 from local storage 421. The local storage 421 can comprise, for example, a DVD, CD, or a hard disc. The local storage 421 can store data in streams, such as a video elementary stream or audio elementary stream. When the playback engine 421 provides data from the local storage 421, the playback engine packetizes the data into packets 120.

It is noted that the elementary stream can be packetized several times. For example, the elementary stream can be packetized and carried in the payload of what is known as the packetized elementary stream. The packetized elementary stream can then be packetized and carried in the payload 420' of transport packets 420.

The transport packets 420, including the data carried in the payload 420' can be encoded in accordance with a variety of encoding standards. The encoding standards can include, for example, MPEG, DirecTV, DVD Input, PES input, ES input, or DirecTV with MPEG-1, to name a few.

Generally, the elementary stream is encoded using the same encoding standard. However, other elementary streams that are multiplexed onto the same communication channel may be encoded with a different encoding standard.

The register 410 identifies the encoding standards for each of the transport packets 420. The register 410 can comprise hardware components, such as logic, or may be a programmed circuit. The register 410 inserts an identifier into each transport packet 420 that identifies the encoding for the packet.

Figure 4B:
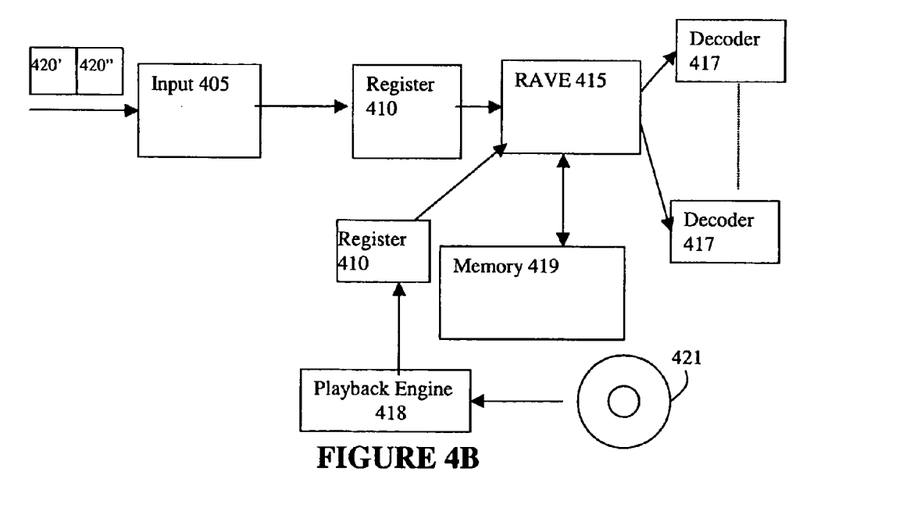
FIG. 4B is a block diagram of an alternative circuit for processing data in accordance with an embodiment of the present invention.

In certain embodiments of the present invention, the same register 410 can identify the encoding standards for each of the transport packets 120 from the playback engine 418 and the input 405, while in other embodiments, separate registers 410 may be used. Thus in FIG. 4B, there is illustrated another embodiment of the present invention wherein separate registers 410 identify the encoding standards for each of the transport packets 120.

In certain embodiments of the present invention, the register 110 identifies the encoding standard for the packet by examining a field in the transport packet header 420". For example, when the playback engine 418 provides packets 120 to the register 110, the playback engine 418 may insert the field in the transport packet header 420".

Additionally, the register 410 can also determine and insert other information about the packet 420 into the packet 420. For example, in certain embodiments of the present invention, the register 410 can determine the length of the packet and insert another identifier that identifies the length of the packet.

The identifier(s) can be inserted into the transport packet 420 in a variety of ways. In certain embodiments of the present invention, the identifier(s) can be appended to the packet header 420". In other embodiments, the register 410 can attach another header to the packet 420. The header can include the identifier(s).

The RAVE 415 uses this information to decide how to process a given packet on a dynamic basis. The processing states of the various streams, as well as the processing rules, can be stored in memory 419. A new set of states and rules may then be loaded at each packet time.

The RAVE 415 receives and processes the packets 420. The RAVE 415 processes each of the packets based on rules that are associated with the encoding standard for the packet. Accordingly, the RAVE 415 examines the identifier identifying the encoding standard for the packet 420. Based on the identifier, the RAVE 420 selects a set of rules that are associated with the encoding standard.

The RAVE 415 provides each elementary stream to a particular one of the decoders 417 associated with the elementary stream.

In order to accurately demultiplex transport packets 420 with different encoding standards, the RAVE 420 treats each transport packet 420 independently, without influence from previous transport packets 420. Thus, state machine states of the RAVE 415 are stored into memory 419 at the end of processing each transport packet 420. The memory 419 associates the state machines states of the RAVE 415 with contexts. Each type of encoding standard is associated with a particular context.

When the RAVE 415 receives a transport packet 420 with a particular encoding standard, the RAVE 415 retrieves and loads the state machine state in the context associated with the encoding standard. Upon completing processing of the transport packet 420, the RAVE 415 writes the state machine state to the context in memory 419 that is associated with the encoding standard for the processed transport packet 420.

The RAVE 415 can comprise the system(s) and apparatus, and employ the method(s) of the following applications which are incorporated herein by reference for all purposes:

| Filed | Serial Number |
|---|---|
| May 05, 2005 | 60/685,781 |
| May 31, 2005 | 60/685,986 |
| May 31, 2005 | 60/685,779 |
| Nov. 14, 2005 | 11/273,282 |
| Mar. 31, 2006 | 11/394,877 |
| Nov. 11, 2006 | 11/273,102 |
| Mar. 21, 2006 | 11/394,421 |
| Mar. 21, 2006 | 11/385,307 |

Figure 5:
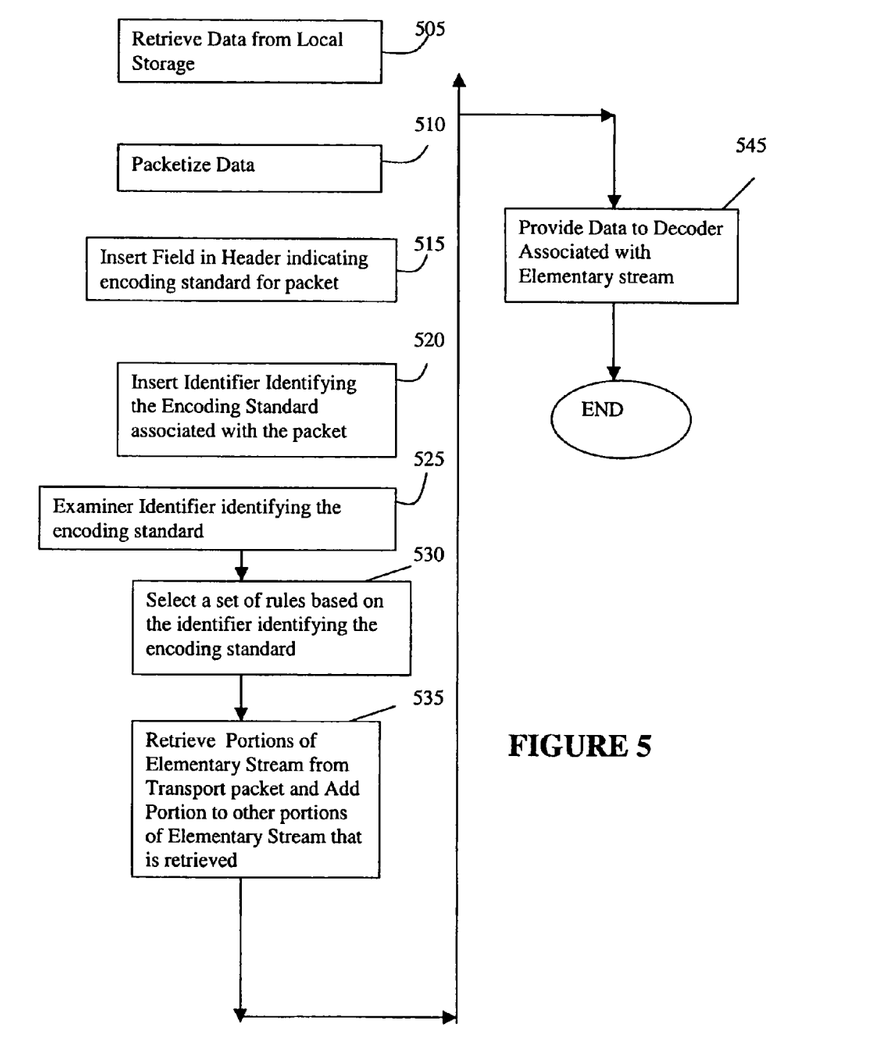
FIG. 5 is a flow diagram for processing data in accordance with an embodiment of the present invention.

Referring now to FIG. 5, there is illustrated a flow diagram for processing data in accordance with an embodiment of the present invention. At 505, the playback engine 418 retrieves data from the local storage 421 and packetizes the data at 510. The playback engine 418 inserts at 515, a field in the header 420" of the packet indicating the encoding standard for the packet 420. The field can also indicate that the packet 420" is sent by the playback engine 418 from the local storage 421.

At 520, the register 410 receives the packet 420" and inserts an identifier identifying the encoding standard associated with the packet 420. At 525, the RAVE 415 examines the identifier identifying the encoding standard. At 530, the RAVE 415 selects a set of rules based on the identifier identifying the encoding standard and applies them to the packet 420.

At 535, the RAVE 415 retrieves portions of an elementary stream from the transport packet and adds the portion to other portions of the elementary stream that are retrieved. RAVE provides the ES data to the decoder 417 associated with the elementary stream at 545.

The embodiments described herein may be implemented as a board level product, as a single chip, application specific integrated circuit (ASIC), or with varying levels of the system integrated with other portions of the system as separate components. Alternatively, if the processor is available as an ASIC core or logic block, then the commercially available processor can be implemented as part of an ASIC device wherein certain aspects of the present invention are implemented as firmware.

The degree of integration may primarily be determined by the speed and cost considerations. Because of the sophisticated nature of modern processors, it is possible to utilized a commercially available processor, which may be implemented external to an ASIC implementation.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   receiving a multiplexed transport stream comprising a plurality of transport packets, wherein each of the plurality of transport packets in the multiplexed transport stream comprises a payload carrying encoded video or audio data, wherein the encoded video or audio data of each of the plurality of transport packets is encoded in accordance with an encoding standard from a plurality of encoding standards and is packetized before being included within the payload of the transport packet; and wherein at least some of the plurality of transport packets do not include a field within a header of the transport packet identifying the encoding standard associated with the payload of the transport packet;
   for each of the plurality of transport packets in the multiplexed transport stream:
       identifying the encoding standard associated with the encoded video or audio data being carried within the payload of the transport packet; and
       inserting into the header of the transport packet an identifier corresponding to the encoding standard associated with the encoded video or audio data being carried within the payload of the transport packet; and
   demultiplexing the multiplexed transport stream by applying one or more of the plurality of rules to each transport packet in the multiplexed transport stream based on the encoding standard associated with the identifier of the transport packet.

2. The method of claim 1, wherein the inserting comprises: appending to the header the identifier corresponding to the identified encoding standard.

3. The method of claim 2, wherein the inserting further comprises maintaining other pre-existing headers of the transport packet.

4. The method of claim 1, wherein the inserting comprises: replacing a field in the header with the identifier corresponding to the identified encoding standard.

5. The method of claim 1, wherein the inserting comprises: adding to the transport packet another header that includes the identifier corresponding to the identified encoding standard.

6. The method of claim 1, wherein identifying the encoding standard further comprises: examining a field in a header of an internal packet carrying the encoded video or audio data within the payload of the transport packet.

7. The method of claim 1, further comprising: processing each transport packet having the inserted identifier in accordance with a rule selected from the plurality of rules, the selection based at least upon the identifier that corresponds to the encoding standard.

8. The method of claim 1, further comprising: for each of the plurality of transport packets, loading a plurality of states, associated with a state machine, in a context that is associated with the identifier that corresponds to the encoding standard.

9. The method of claim 8, further comprising, for each of the plurality of transport packets: processing the transport packet having the inserted identifier; updating the plurality of states during the processing; and upon a completion of the processing, storing the plurality of states in association with the context.

10. The method of claim 1, wherein the plurality of encoding standards includes MPEG transport, DirecTV transport, DVD input, Packetized Elementary Stream input, Elementary stream input, or DirecTV transport with MPEG-I.

11. A system comprising:
an input interface for receiving a multiplexed transport stream comprising a plurality of transport packets, wherein each of the plurality of transport packets in the multiplexed transport stream comprises a payload carrying encoded video or audio data, wherein the encoded video or audio data is encoded in accordance with an encoding standard from a plurality of encoding standards and is packetized before being included within the payload of the transport packet, and wherein at least some of the plurality of transport packets do not include a field within a header of the transport packet identifying the encoding standard associated with the payload of the transport packet;
logic configured to identify, for each of the plurality of transport packets in the multiplexed transport stream, the encoding standard associated with the encoded video or audio data being carried within the payload of the transport packet;
logic configured to insert, for each of the plurality of transport packets in the multiplexed transport stream, an identifier into the header of the transport packet, the identifier corresponding to the encoding standard associated with the encoded video or audio data being carried within the payload of the transport packet; and
a transport demultiplexer configured to receive the transport packet including the inserted identifier and to demultiplex the multiplexed transport stream by applying one or more of a plurality of rules to each transport packet in the multiplexed transport stream based on the encoding standard associated with the identifier of the transport packet.

12. The system of claim 11, the system further comprising: logic configured to insert, for each of the plurality of transport packets, a length of the transport packet into the transport packet.

13. The system of claim 12, wherein the logic configured to insert a length comprises: logic configured to insert, in each of the plurality of transport packets, another header that includes the length of the transport packet.

14. The system of claim 12, wherein the logic configured to insert a length comprises: logic configured to add, to each of the plurality of transport packets, another header that includes the length of the transport packet.

15. The system of claim 11, the transport demultiplexer further comprising: logic configured to select, for each of the plurality of transport packets, a rule from a plurality of rules based at least upon the identifier that corresponds to the encoding standard; and logic configured to apply, for each of the plurality of transport packets, the selected rule to the transport packet.

16. The system of claim 11, further comprising a memory, wherein the transport demultiplexer comprises: logic configured to load from the memory a plurality of states associated with a state machine having a context, the context being associated with the identifier that corresponds to the encoding standard.

17. The system of claim 16, wherein the transport demultiplexer further comprises: logic configured to process each of the plurality of transport packets and to update the plurality of states during the processing; and logic to store the plurality of states in association with the context upon a completion of the processing.

18. A system comprising:
a local storage;
a playback engine configured to retrieve an elementary stream from the local storage and to packetize the elementary stream to produce a transport packet stream, the transport packet stream including a plurality of transport packets, wherein each of the plurality of transport packets in the transport packet stream comprises a payload carrying encoded video or audio data, wherein the encoded video or audio data is encoded in accordance with an encoding standard from a plurality of encoding standards and is packetized before being included within the payload of the transport packet; and wherein at least some of the plurality of transport packets do not include a field within a header of the transport packet identifying the encoding standard associated with the payload of the transport packet;
one or more registers configured to, for each of the plurality of transport packets in the transport packet stream:
identify the encoding standard associated with the encoded video or audio data being carried within the payload of the transport packet;
insert an identifier into the header of the transport packet, the identifier corresponding to the encoding standard associated with the encoded video or audio data being carried within the payload of the transport packet; and
a transport demultiplexer configured to receive the transport packet including the inserted identifier and to demultiplex the multiplexed transport stream by applying one or more of a plurality of rules to each transport packet in the multiplexed transport stream based on the encoding standard associated with the identifier of the transport packet.

19. The system of claim 18, wherein the transport demultiplexer is further configured to: select a rule from a plurality of rules based at least upon the identifier corresponding to the encoding standard; and to apply the selected rule to the transport packet including the inserted identifier.

\* \* \* \* \*